Dec. 17, 1940.  C. E. HUFF  2,225,220
SAFETY DEVICE FOR LOW PRESSURE VESSELS
Filed April 11, 1938  2 Sheets-Sheet 1
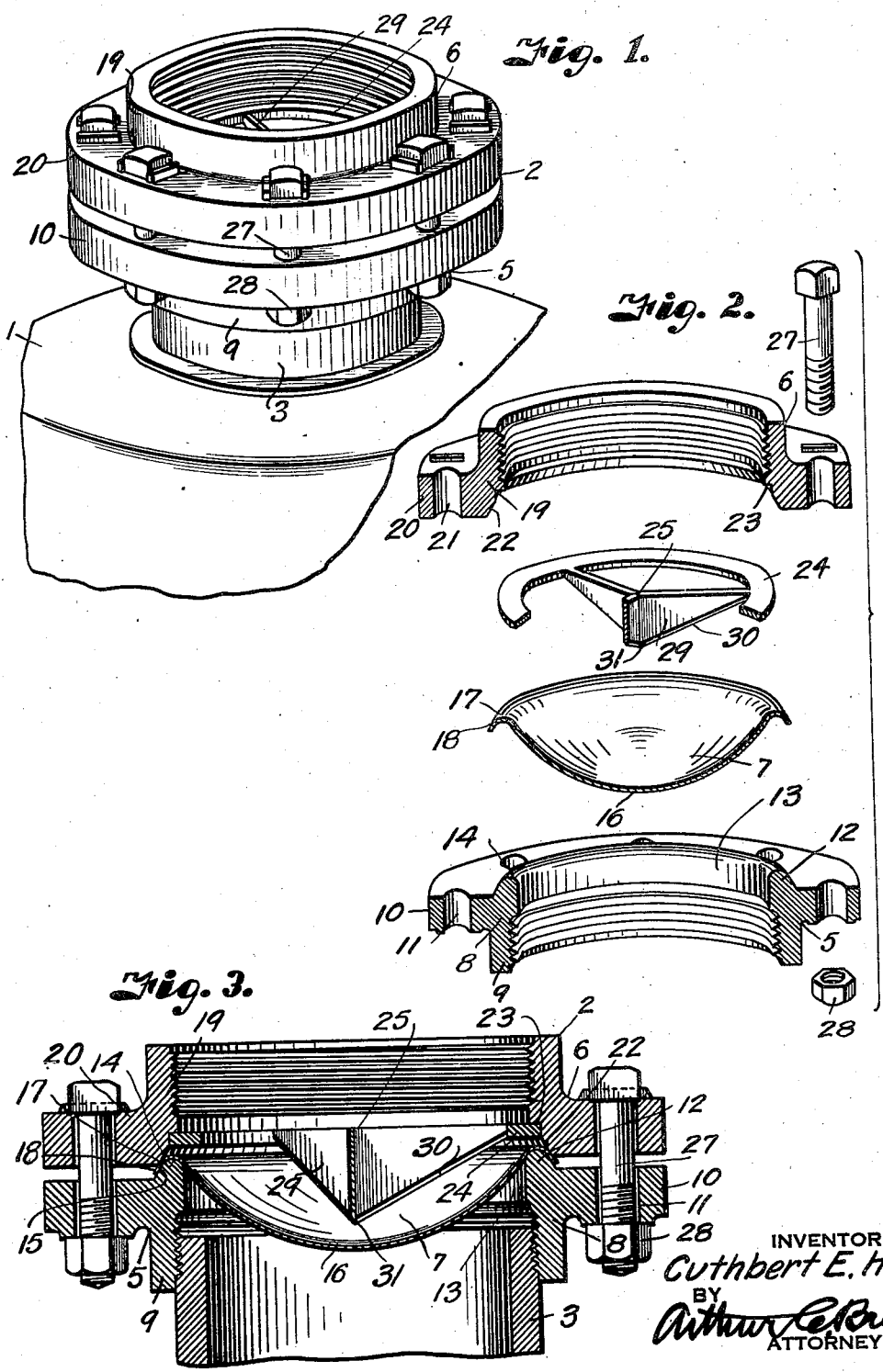
INVENTOR
Cuthbert E. Huff.
BY
Arthur C. Brown
ATTORNEY Dec. 17, 1940. C. E. HUFF 2,225,220
SAFETY DEVICE FOR LOW PRESSURE VESSELS
Filed April 11, 1938 2 Sheets-Sheet 2
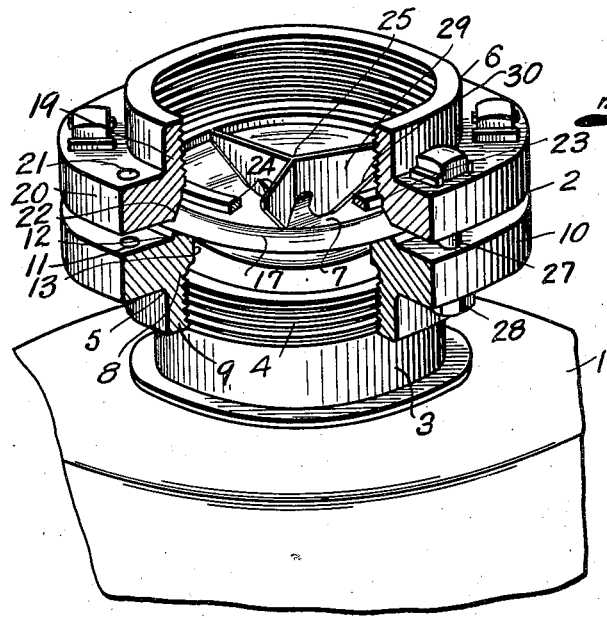
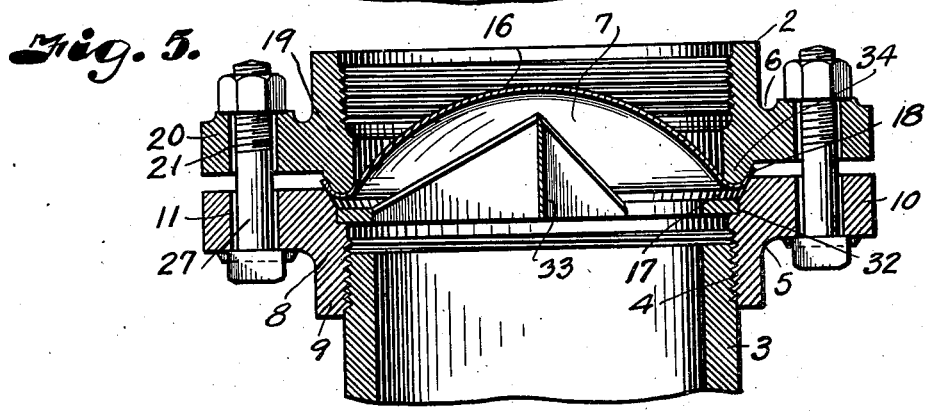
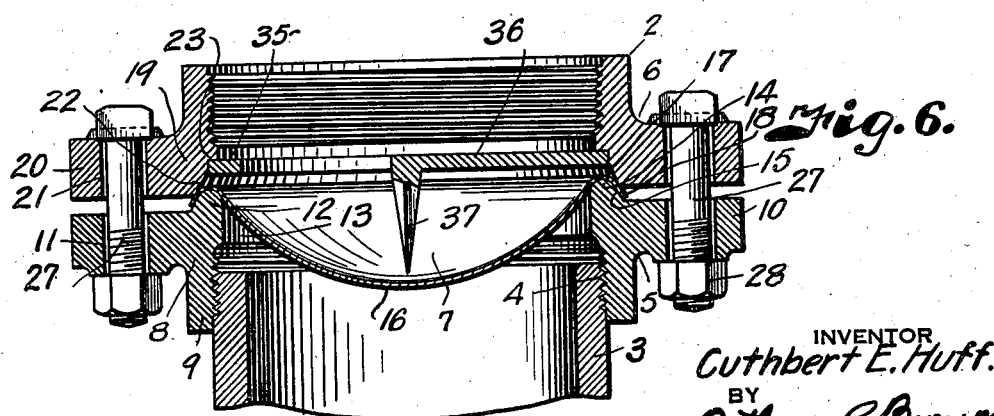
INVENTOR
Cuthbert E. Huff.
BY
Arthur C. Brown
ATTORNEY Patented Dec. 17, 1940

2,225,220

UNITED STATES PATENT OFFICE 2,225,220

SAFETY DEVICE FOR LOW PRESSURE VESSELS

Cuthbert E. Huff, Liberty, Mo.

Application April 11, 1938, Serial No. 201,322

1 Claim. (Cl. 220—89)

This invention relates to safety devices for protecting vessels containing fluids under relatively low pressures, and has for its principal object to provide a safety device of this character which is positive in operation and operable within close limits of the calculated pressure.

Other objects of the invention are to provide a safety device of this character with pressure release means cooperating with a relatively large flexible diaphragm; to provide a safety device equipped with a flexible diaphragm movable responsive to a predetermined pressure differential into severing contact with a shearing or slitting element for effecting release of pressure through the diaphragm; and to provide a safety device capable of withstanding substantial amount of fatigue without affecting the functioning pressures for which it is designed.

It is also an object of the invention to provide a safety device capable of operation under high pressures acting on one side thereof and low pressures acting on the opposite side.

In accomplishing these and other objects of the invention, as hereinafter pointed out, I have provided improved details of structure, the preferred forms of which are illustrated in the accompanying drawings, wherein:

Fig. 1 is a perspective view of a portion of a vessel equipped with a safety pressure device embodying the features of the present invention.

Fig. 2 is a perspective section of the parts of the safety device shown in disassembled spaced relation.

Fig. 3 is a section through the safety device showing the parts in assembled position.

Fig. 4 is a perspective view similar to Fig. 1, but showing a part thereof broken away and illustrating shearing or slitting of the diaphragm responsive to a predetermined pressure in the vessel.

Fig. 5 is a section through a safety device especially adapted for connection with a vessel having substantially high internal pressures and which is capable of functioning in case the internal pressures should drop dangerously below the external pressure to protect the vessel against collapse.

Fig. 6 is a section through a form of the invention illustrated in Fig. 3, but showing a modified form of puncturing device.

Referring more in detail to the drawings:

1 designates a vessel which may be part of a fluid pressure system that is protected with a safety device 2 embodying the present invention, and which is adapted to function for releasing pressure should the contained pressures exceed those for which the vessel or system is designed.

In the illustrated instance the safety device 2 is mounted upon a nipple 3 secured within an opening at the upper end of the vessel and which is provided with threads 4 for mounting a main clamping member 5 to cooperate with a clamping member 6 in retaining a flexible diaphragm 7 in covering relation with the opening of the nipple 3. The clamping member 5 includes a ring-shaped body 8 having a downwardly depending annular collar portion 9 internally threaded to receive the threads 4 of the nipple 3. Extending circumferentially of the body 8 is an annular flange 10, having openings 11 to accommodate fastening devices, later described.

The clamping member 5, illustrated in Figs. 1, 2, 3, 4 and 6, has an annular rib or raised portion 12 projecting from the upper face of the flange 10, in encircling relation with the opening 13 in the ring-shaped body. The rib or raised portion has a rounded diaphragm seat 14 terminating in the direction of the flange 10, in an outwardly flaring gripping face 15.

The diaphragm 7 is formed of sheet material and includes a central, concavo-convex portion 16 and an annular rim portion 17 terminating in an outwardly flaring flange 18 conforming to the curvature of the seat 14 and clamping face 15 of the member 5, the diaphragm being arranged so that the convex side thereof extends in the direction of the vessel whereby pressures within the vessel act against the convexity of the diaphragm. When thus mounted upon the clamping member 5, the rounded rim closely engages the rounded seat of the annular boss 12 and the flange 18 engages against the clamping face 15, as clearly shown in Fig. 3. The concavo-convex portion 16 of the diaphragm may be of substantially arcuate or elliptical cross-section. The diaphragm is formed of material having a thickness and tensile strength proportional to its diameter so that it will be substantially self-supporting under normal pressures, but will yield when external pressures acting on the concave side thereof exceed the internal pressures to the point where collapse of the vessel is likely to occur. The depth of the convexity and tensile strength of the material is also designed so that when excessive predetermined pressures occur within the vessel the pressure will cause the diaphragm to reverse itself and engage a shear or slitting element later described. I have found that the diaphragm may be constructed to disrupt in either direction within very close limits of the predetermined pressure differentials for any diameter of opening, the thickness and tensile strength of the material being considered.

The clamping ring 6 includes a ring-like body 19 having an outwardly extending flange 20 that is provided with openings 21 adapted to align with openings 11 in the flange 10, previously described. The clamping member 6, in Figs. 1 to 4 inclusive and 6, has a beveled clamping face 22 that seats over the flaring flange 18 of the diaphragm. Inset within the ring-like body, directly above the bevel 22, is a shoulder groove 23 arranged to seat the rim 24 of a shearing or slitting element 25 that is carried by the upper clamping member 6. The upper clamping member is secured to the lower clamping member to sealingly retain the diaphragm by fastening devices, such as bolts, having shanks 27 extending through the aligning openings 21 and 11 and which have nuts 28 mounted thereon to cooperate with the heads of the bolts for drawing the clamping members into clamping contact with the diaphragm.

The member 25 includes central, spider-like blades 29 arranged in planes extending through the axis of the diaphragm and having cutting edges 30 sloping from the rim 24 toward the axis of the diaphragm, to form a point 31 at the center of the safety device. When excess pressure occurs in the vessel it acts to reverse the diaphragm and forces the diaphragm against the converging point 31 of the blades to effect penetration thereof and slitting of the diaphragm as the diaphragm moves over the edges of the blades as illustrated in Fig. 4.

With a safety device constructed and assembled as illustrated in Figs. 1 to 4 inclusive, and which has been designed to function at a predetermined internal pressure, the diaphragm is sufficiently strong to withstand normal working pressures within the vessel without fatigue, however, should these pressures exceed the normal working pressures and reach the point for which the diaphragm is designed to function the pressure will act against the convex side to cause reversal of the diaphragm which effects movement thereof under pressure into contact with the juncture point 31 of the blades so that further movement will cause the diaphragm to slit radially as it is drawn against the inclined cutting edges 30. As soon as the cuts are partially formed, the escaping pressure will assist in ripping of the diaphragm so that the triangular segments thereof will blow outwardly through the sector-shaped openings between the blades.

Assuming that the internal pressures should drop considerably below the external or atmospheric pressures acting on the concave side of the diaphragm, as in the instance of a vessel containing gasoline or other quickly condensable vapors where sudden cooling of the vapors produces a vacuum within the container, the external pressures will then come into action to effect disruption of the diaphragm in substantially the same manner as the diaphragm described in the patent issued to Gwynne Raymond, No. 1,930,960, dated October 17, 1999.

In Fig. 5 the clamping member 5 has a shouldered groove 32 for carrying a severing device 33 similar to that illustrated in Figs. 1 to 4, and the clamping member 6 has a diaphragm seating rib 34 so that the diaphragm and shearing elements are arranged reversely to those illustrated in Fig. 3. In this form the internal pressure of the vessel acts against the concave side of the diaphragm to effect blowout thereof in accordance with the diaphragms of the above mentioned patent, and in case higher vacuum pressures should occur on the concave side of the diaphragm, these pressures will act to reverse the concavity thereof and move the diaphragm into slitting engagement with the severing device.

In Fig. 6 I have shown a further modified form of the invention wherein the parts of the safety device are identically the same as those illustrated in the preferred form, however, the severing device includes a rim 35 having an inwardly projecting arm 36 that carries a depending dagger or spear-like point 37 that acts to penetrate the diaphragm when excessive pressures reverse the concavity thereof.

What I claim and desire to secure by Letters Patent is:

In a safety device for pressure systems having a relief opening, a concavo-convex diaphragm yieldably responsive to pressure acting on the convex side, means supporting the diaphragm in sealed relation with said opening, a diaphragm severing device positioned in said system adjacent the concave side of the diaphragm including a plurality of radially arranged blades having cutting edges inclined toward the axis of said opening and said diaphragm and terminating in a point at said axis, and means supporting the severing device with said blades contained within the concavity of the diaphragm.

CUTHBERT E. HUFF.